US006939262B1

(12) United States Patent
Yu

(10) Patent No.: US 6,939,262 B1
(45) Date of Patent: Sep. 6, 2005

(54) MULTIPLE GEARING SWITCH DEVICE

(76) Inventor: Ling-Ling Yu, 12F., No. 31, Lane 101, Ciguang St., Taoyuan City, Taoyuan Hsien (TW)

(*) Notice: Subject to any disclaimer, the term of this patent is extended or adjusted under 35 U.S.C. 154(b) by 0 days.

(21) Appl. No.: 10/789,833

(22) Filed: Feb. 27, 2004

(51) Int. Cl.$^7$ ........................................ F16H 37/02
(52) U.S. Cl. ...................... 475/218; 475/269; 475/317; 475/319; 475/207; 74/353; 74/354
(58) Field of Search ............................... 475/207, 218, 475/269, 317, 319; 74/353, 354

(56) References Cited

U.S. PATENT DOCUMENTS 3,921,264 A * 11/1975 Madonian et al. .......... 475/154
5,897,454 A * 4/1999 Cannaliato .................. 475/265
6,086,502 A * 7/2000 Chung ........................ 475/299
6,431,289 B1 * 8/2002 Potter et al. .................. 173/47
6,655,470 B1 * 12/2003 Chen ........................... 173/47

FOREIGN PATENT DOCUMENTS

GB 2059524 A * 4/1981 ............. F16H 3/34

* cited by examiner

*Primary Examiner*—Charles A. Marmor
*Assistant Examiner*—David D. Le

(57) ABSTRACT

A gearing switch device includes a switch assembly that is switched to one of positions to engage one of the gears in an idle gear set with an input gear and a transferring gear of a speed reduction device. The transferring gear drives a ring gear that is engaged with planetary gears device connected to one side of a disk and an output gear is connected to the other side of the disk. By the different types of engagement between the gears of the idle gear set and the transferring gear, the speed of the disk is changeable so as to have desired output torque.

8 Claims, 10 Drawing Sheets

MULTIPLE GEARING SWITCH DEVICE

FIELD OF THE INVENTION

The present invention relates to a multiple gearing switch device that employs a switch assembly and an idle gear set to operate a planetary gear speed reduction device so as to obtain multiple output speeds in desired directions.

BACKGROUND OF THE INVENTION

Conventional electric tools, especially those including spinning device, generally employ a speed reduction device to provide multiple gearing feature and have different output torques. The speed reduction device includes a planetary gear system including a sun gear, a plurality of planet gears, inner gears and a disk. These gears and disk are arranged to play different roles, such as input or output members, so as to have different output speeds. Nevertheless, complicated assembling and/or manufacturing difficulties are involved in the existing electric tools with multiple gearing switch device such that high price and risk of maintenance are commonly seen, which does not satisfy the users. Besides, only two or three speeds can be chosen because of limitations of the conventional gearing switch device.

Therefore, it is desired to have a gearing switch device that is able to improve one or more problems existing in the conventional gearing switch device.

SUMMARY OF THE INVENTION

In accordance with an aspect of the present invention, there is provided a gearing switch device that comprises a casing in which a speed reduction device is received and includes a disk which has a plurality of planet gears on a first side of the disk and an input gear is located between and engaging the planet gears. An output gear is connected to the other side of the disk. A ring gear has inner teeth engaging the planet gears, and outer teeth engaging two transferring gears connected to the casing. A switch assembly has a switch member with a plurality of recesses defined in an outer periphery thereof and the transferring gears are located in the recesses. Each recess has engaging teeth defined in a side thereof. A protrusion extends radially outward from the switch member and through a slot defined through a wall of the casing. A plurality of idle gear sets is connected to a side of the switch member and each has a first idle gear and a second idle gear. Teeth of each of the first idle gear and the second idle gear are located in alignment with the engaging teeth of the recesses. The first idle gear and the second idle gear are located at different radial positions such that only one of the first idle gear and the second idle gear is engaged with the input gear in the same time. One of the first and second idle gears or the engaging teeth selectively engage the transferring gears.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
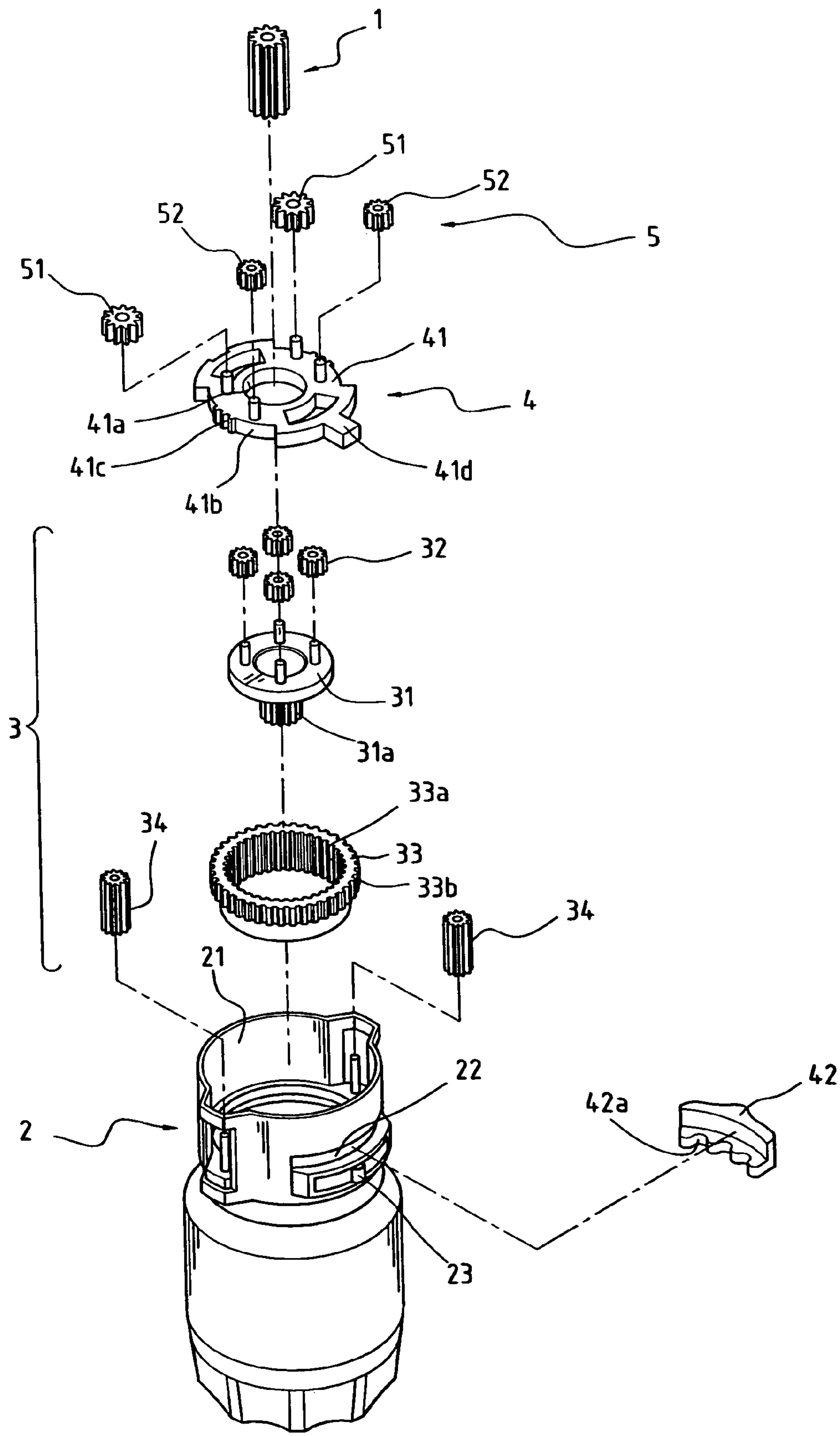
FIG. 1 is an exploded view of a gearing switch device in accordance with the present invention.
Figure 2:
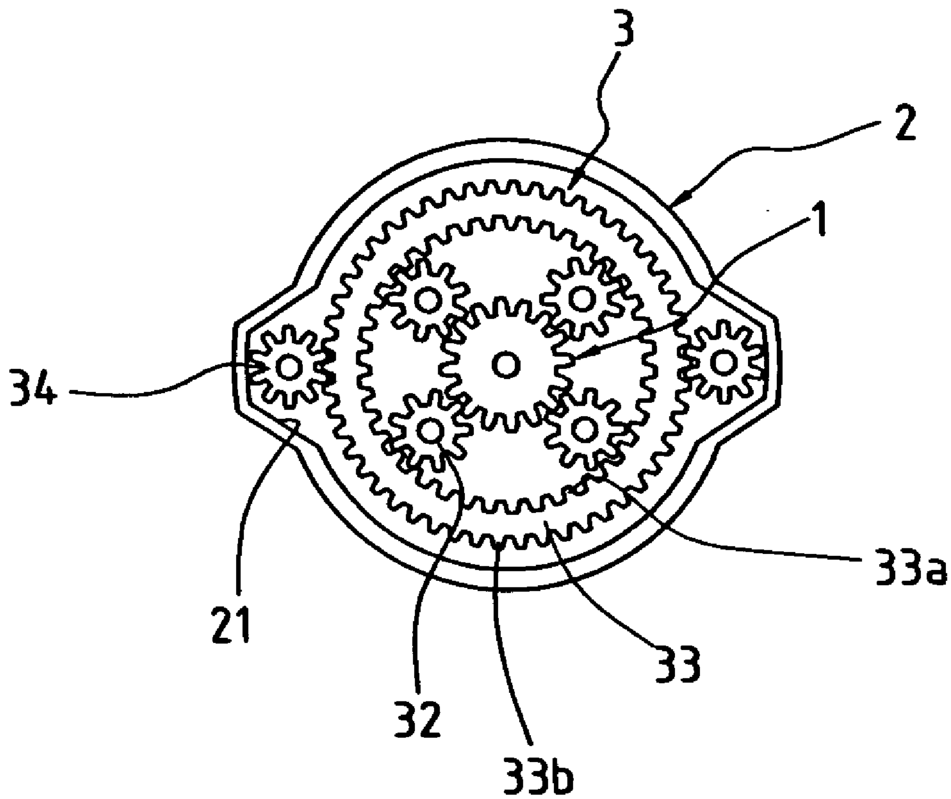
FIG. 2 shows an input gear engaging planet gears which engage a ring gear and two transferring gears engage the ring gear.

Referring to the drawings and in particular to FIGS. 1 and 2, a gearing switching device of the present invention is received in a receiving space 21 defined in a casing 2 of a tool that is not shown. The gearing switching device comprises an input gear 1 and a speed reduction device 3 is received in the casing 2 and has a disk 31 that has four planet gears 32 on a first side of the disk 31 and the input gear 1 is located between and engaged with the planet gears 32. An output gear 31*a* is connected to the other side of the disk 31 and drives an output shaft that is not shown. A ring gear 33 has inner teeth 33*a* in an inner periphery and outer teeth 33*b* in an outer periphery of the ring gear 33. The planet gears 32 are engaged with the inner teeth 33*a*, and two transferring gears 34 are connected to the casing 2 and engaged with the outer teeth 33*b*.

Figure 3:
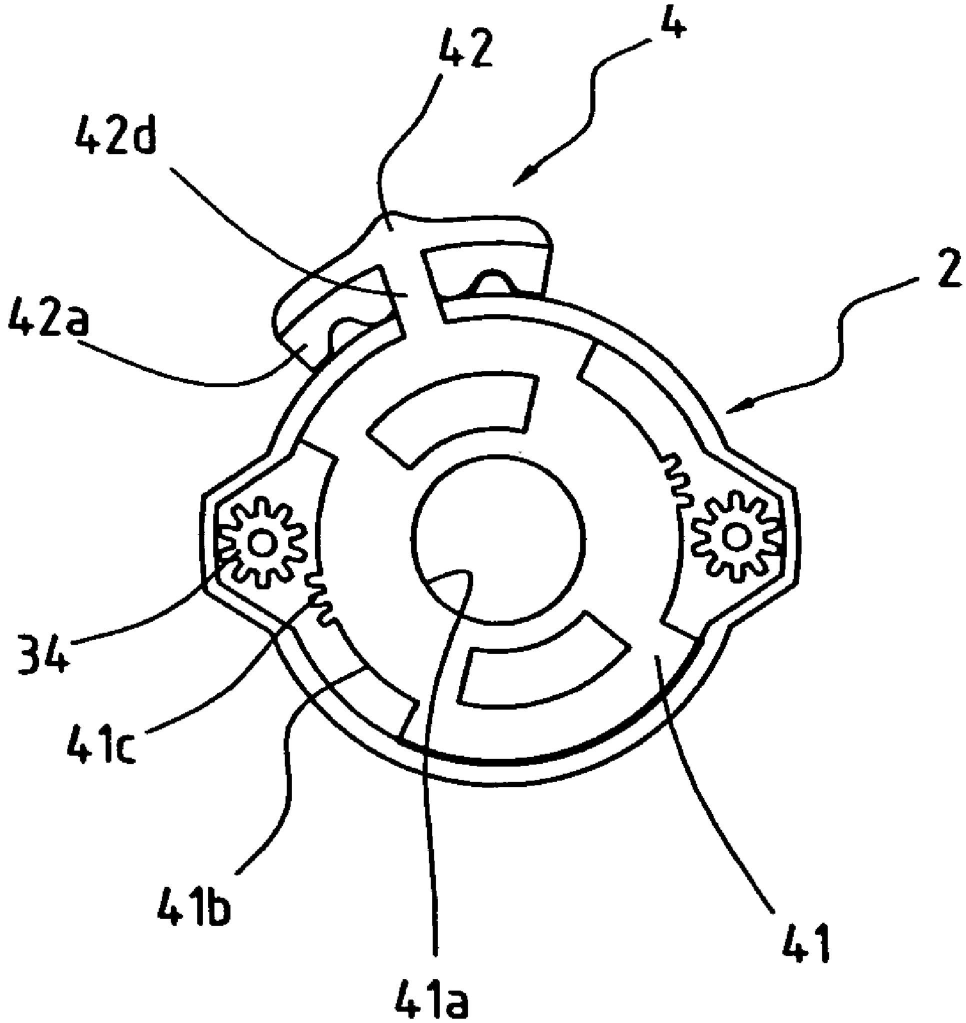
FIG. 3 shows the flexible boss on the casing is engaged with one of the notches of the switching knob.

A switch assembly 4 has a switch member 41 with a central hole 41*a* for the input gear 1 to extend therethrough and two recesses 41*b* are defined in an outer periphery of the switch member 41 such that the transferring gears 34 are located in the two recesses 41*b*. Each recess 41*b* has engaging teeth 41*c* defined in a side thereof. A protrusion 41*d* extends radially outward from the switch member 41 and through a slot 22 defined through a wall of the casing 2. Further referring to FIG. 3, a switching knob 42 is connected to the protrusion 41*d* and has a plurality of notches 42*a*. A flexible boss 23 extends from an outer periphery of the casing 2 and located beside the slot 22. The flexible boss 23 is engaged with one of the notches 42 when the switching knob 42 is shifted by the user.

Two idle gear sets 5 are connected to a side of the switch member 41 and each idle gear set 5 has a first idle gear 51 and a second idle gear 52. Teeth of each of the first idle gear 51 and the second idle gear 52 are located in alignment with the engaging teeth 41*c* of the recesses 41. The first idle gear 51, the second idle gear 52 and the engaging teeth 41*c* are located at different radial positions such that only one of the first idle gear 51, the second idle gear 52 and the engaging teeth 41*c* can be engaged with the input gear 1 in the same time.

Figure 4:
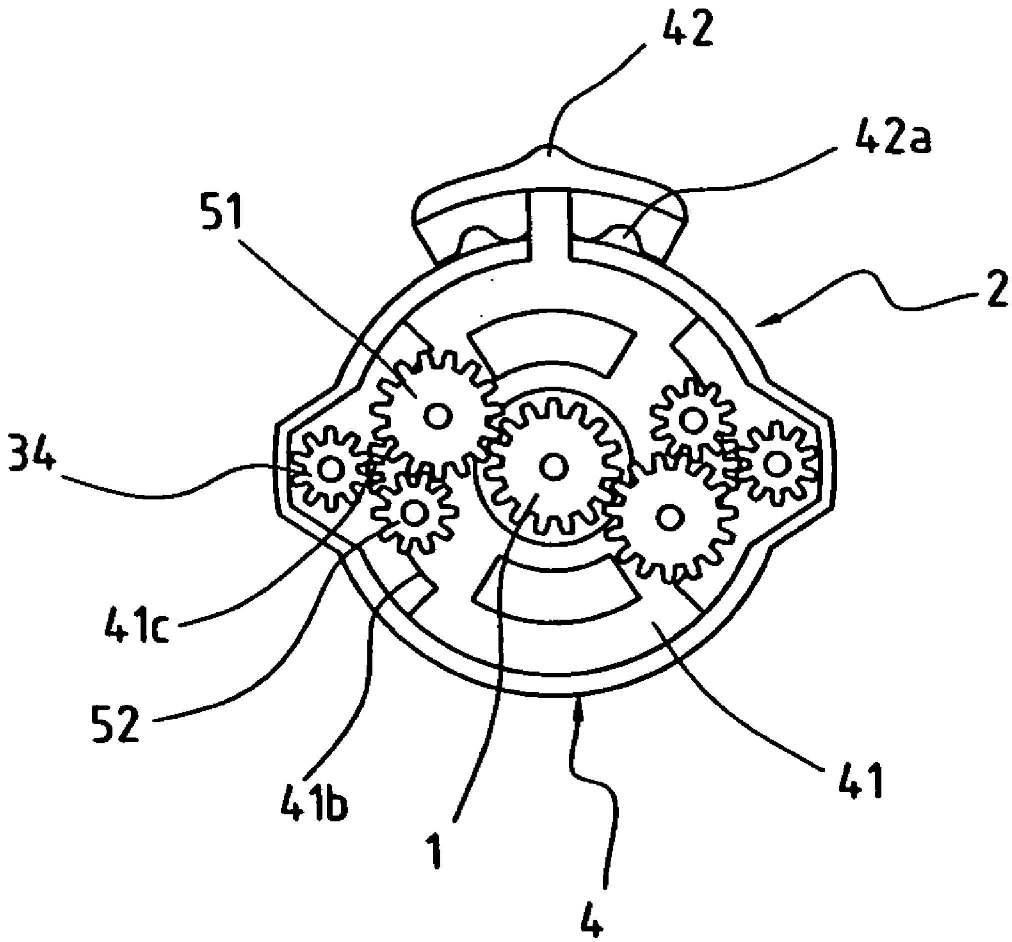
FIG. 4 shows that the teeth of the insides are engaged with the transferring gears and the first idle gears are engaged with the input gear.

Referring to FIG. 4, when shifting the switching member 41 by shifting the switching knob 42 to a position as shown, only the engaging teeth 41*c* are engaged with the transferring gears 34, so that transferring gears 34 are stationary. Because the transferring gears 34 are engaged with the ring gear 33 so that the ring gears 33 is stationary. Therefore, the power brought by the input gear 1 drives the planet gears 32, the first idle gears 51 and the second idle gears 52. The first idle gears 51 and the second idle gears 52 do not drive any part and the planet gears 32 are rotated in the ring gear 33 so that the speed of the disk 31 together with the output gear 31*a* is reduced. The output torque is increased.

Figure 5:
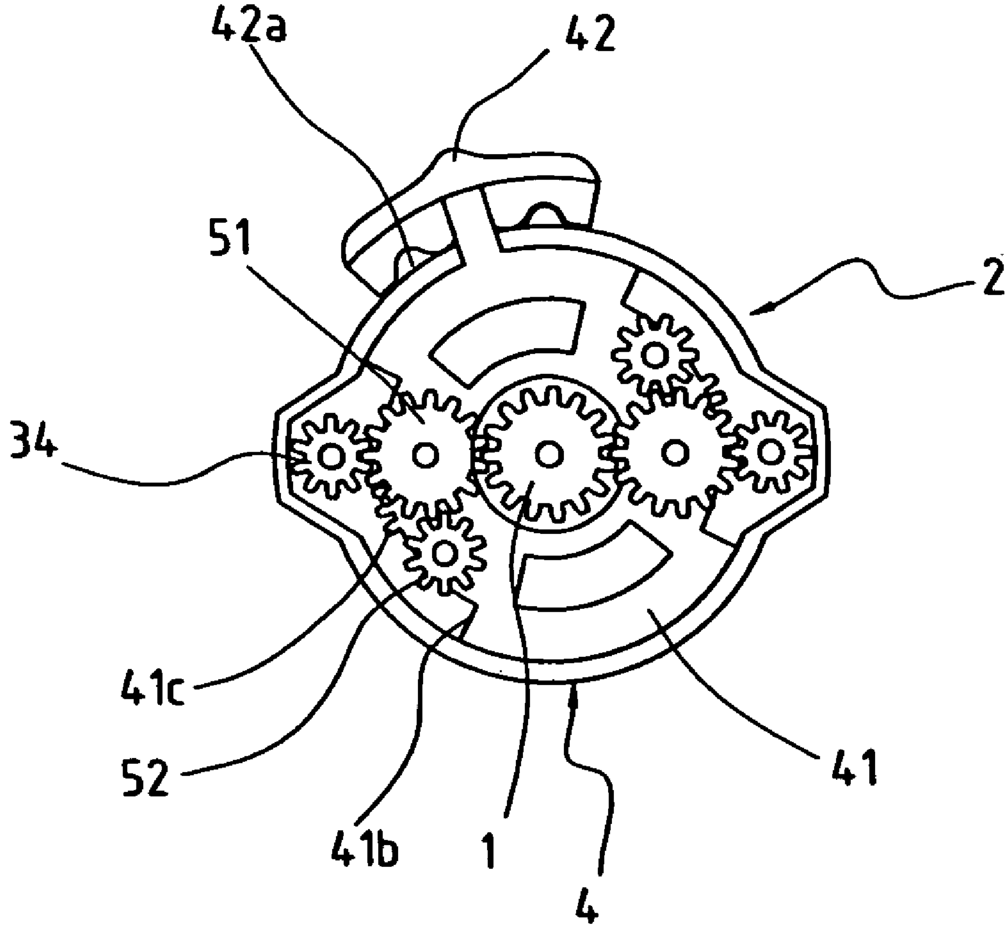
FIG. 5 shows that the first idle gears are engaged with the transferring gears and the input gear.

Referring to FIG. 5, when shifting the switching member 41 to another position as shown, the first idle gears 51 are engaged with the transferring gears 34 and driven by the input gear 1. The transferring gears 34 rotate in the same direction as the input gear 1. The transferring gears 34 drives the ring gear 33 so that the power brought by the input gear 1 drives the planet gears 32, the first idle gears 51 and the second idle gears 52 which do not drive any part. The planet gears 32 are rotated relative to the ring gear 33 so that the speed of the disk 31 together with the output gear 31*a* is reduced. The output torque is increased.

Figure 6:
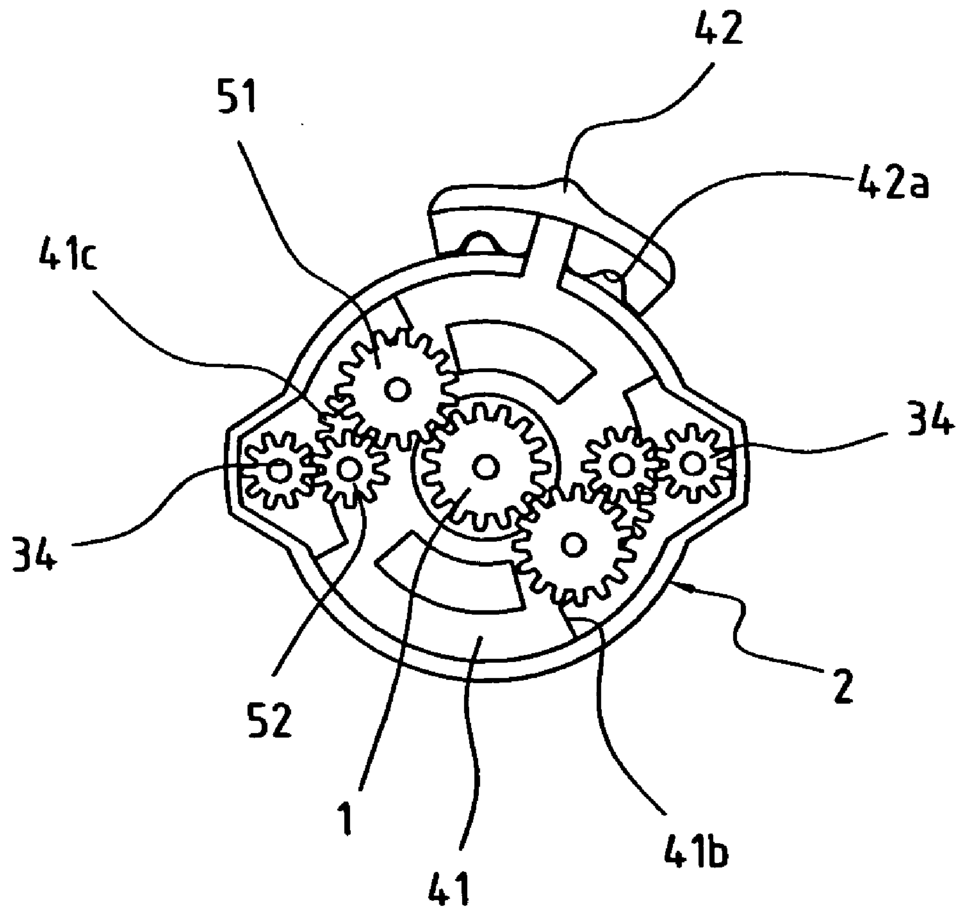
FIG. 6 shows that the second idle gears are engaged with the transferring gears and the first idle gears are engaged with the input gear.

Referring to FIG. 6, when the switching member 41 is shifted to yet another position as shown, only the second idle gears 52 are engaged with the transferring gears 34 and the second idle gears 52 are driven by the first idle gears 51 which is driven by the input gear 1. The transferring gears 34 rotate in the opposite direction of the input gear 1. The transferring gears 34 drives the ring gear 33 so that the power brought by the input gear 1 drives the planet gears 32, the first idle gears 51 and the second idle gears 52. The planet gears 32 are rotated relative to the ring gear 33 so that the speed of the disk 31 together with the output gear 31*a* is reduced. The output torque is increased.

It is noted that the power from the input gear 1 is transferred to the speed reduction device 3 via the idle gear set 5 and the transferring gears are driven by the idle gear set 5 to drive the ring gear 33 at different speed and directions so as to obtain different speed and directions for the disk 31 and the output gear 31*a*. Therefore, different types of arrangement of the idle gear set 5, the transferring gears 34 and the input gear 1 may obtain multiple gearing functions, and are described hereinafter.

Figure 7:
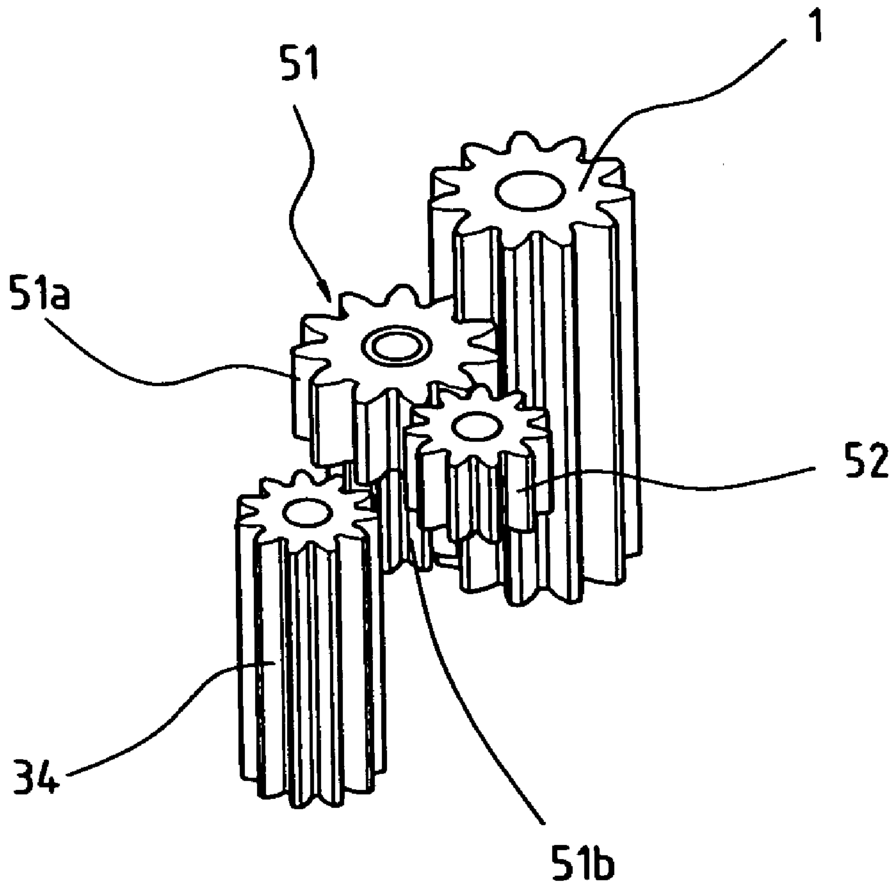
FIG. 7 shows that the first idle gears are composed of an upper gear and a lower gear.

Referring to FIG. 7, the first idle gear 51 that is engaged with the input gear 1 of each of the idle gear sets 5 includes an upper gear 51*a* and a lower gear 51*b* that is co-axially connected to the upper gear 51*a*. The upper gear 51*a* and the lower gear 51*b* have different number of teeth. The upper gear 51*a* is engaged with the second idle gear 52 and the lower gear 51*b* is engaged with the transferring gear 34.

Figure 8:
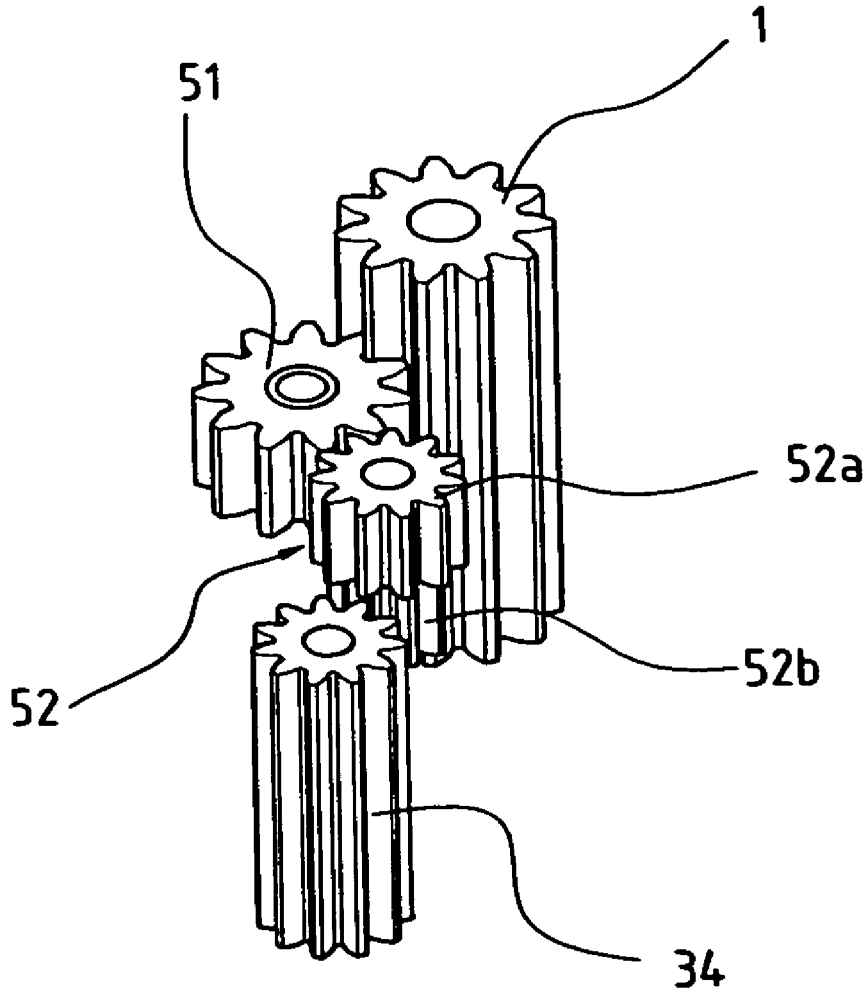
FIG. 8 shows that the second idle gears are composed of an upper gear and a lower gear.

Referring to FIG. 8, the second idle gear 52 that is not engaged with the input gear 1 of each of the idle gear sets 5 includes an upper gear 52*a* and a lower gear 52*b* which is co-axially connected to the upper gear 52*a*. The upper gear 52*a* and the lower gear 52*b* have different number of teeth. The upper gear 52*a* is engaged with the first idle gear 51 and the lower gear 51*b* is engaged with the transferring gear 34.

Figure 9:
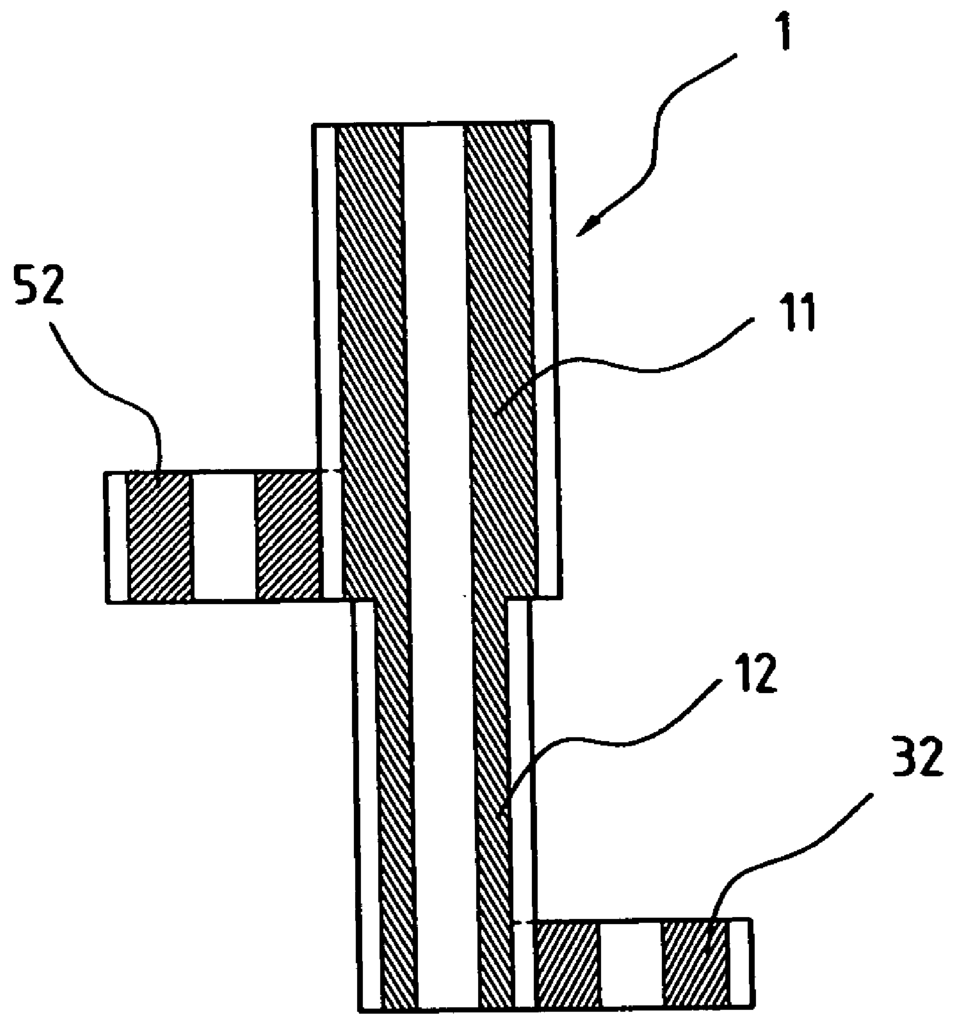
FIG. 9 shows that the input gear is composed of an upper portion and a lower portion.

Referring to FIG. 9, the input gear 1 includes an upper portion 11 and a lower portion 12 that is co-axially connected to the upper portion 11. The upper portion 11 and the lower portion 12 have different number of teeth. The upper portion 11 is engaged with the first idle gear 51, and the lower portion 12 is engaged with planet gears 32.

Figure 10:
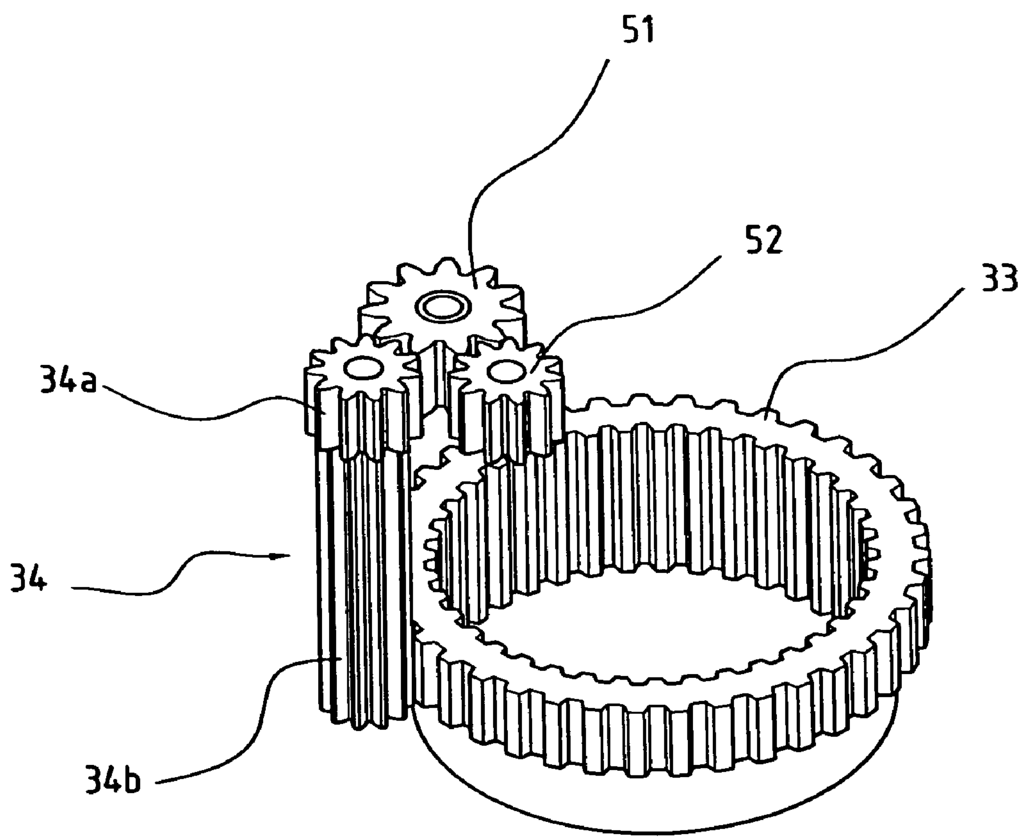
FIG. 10 shows that the transferring gear is composed of an upper transferring gear and a lower transferring gear.

Referring to FIG. 10, the transferring gear 34 includes an upper transferring gear 34*a* and a lower transferring gear 34*b* that is co-axially connected to the upper transferring gear 34*a*. The upper transferring gear 34*a* and the lower transferring gear 34*b* have different number of teeth. The upper transferring gear 34*a* is engaged with one of the first idle gear 51 or the second idle gear 52 in the same idle gear set 5 and the lower transferring gear 34*b* is engaged with the gear ring 33.

It is also noted that a number of the gears in each of the idle gear set 5 can be increased, or adding some gears that can change speed in the idle gear set 5 so as to obtain more options of the gearing features.

While we have shown and described the embodiment in accordance with the present invention, it should be clear to those skilled in the art that further embodiments may be made without departing from the scope of the present invention.

What is claimed is:

1. A gearing switch device comprising:

an input gear;

a casing having a receiving space and a slot defined through a wall of the casing;

a speed reduction device received in the casing and having a disk which has a plurality of planet gears on a first side of the disk and the input gear located between and engaged with the planet gears, an output gear connected to the other side of the disk, a ring gear having inner teeth in an inner periphery and outer teeth in an outer periphery of the ring gear, the planet gears engaged with the inner teeth, a plurality of transferring gears connected to the casing and engaged with the outer teeth;

a switch assembly having a switch member with a central hole and a plurality of recesses defined in an outer periphery of the switch member such that the transferring gears located in the recesses, each recess having engaging teeth defined in a side thereof, a protrusion extending radially outward from the switch member and through the slot of the casing;

a plurality of idle gear sets connected to a side of the switch member each having a first idle gear and a second idle gear, teeth of each of the first idle gear and the second idle gear located in alignment with the engaging teeth of the recesses, the first idle gear, the second idle gear and the engaging teeth located at different radial positions such that only one of the first idle gear, the second idle gear and the engaging teeth is engaged with the input gear in the same time, one of the first idle gear, the second idle gear or the engaging teeth being alternatively engaged with the transferring gears.

2. The switch device as claimed in claim 1, wherein a flexible boss extends from an outer periphery of the casing and located beside the slot, a switching knob connected to the protrusion and having a plurality of notches so that the flexible boss is engaged with one of the notches.

3. The switch device as claimed in claim 1, wherein the first idle gear that is engaged with the input gear of each of the idle gear sets includes an upper gear and a lower gear which is co-axially connected to the upper gear, the upper gear and the lower gear having different number of teeth, the upper gear engaged with the second idle gear in the same idle gear set and the lower gear engaged with the transferring gear.

4. The switch device as claimed in claim 1, wherein the second idle gear that is not engaged with the input gear of each of the idle gear sets includes an upper gear and a lower gear which is co-axially connected to the upper gear, the upper gear and the lower gear having different number of teeth, the upper gear engaged with the first idle gear in the same idle gear set and the lower gear engaged with the transferring gear.

5. The switch device as claimed in claim 1, wherein the input gear includes an upper portion and a lower portion which is co axially connected to the upper portion, the upper portion and the lower portion having different number of teeth, the upper portion engaged with one of the first idle gear and the second idle gear, the lower portion engaged with planet gears.

6. The switch device as claimed in claim 1, wherein the transferring gear includes an upper transferring gear and a lower transferring gear which is co-axially connected to the upper transferring gear, the upper transferring gear and the lower transferring gear having different number of teeth, the upper transferring gear engaged with one of the first idle gear and the second idle gear in the same idle gear set and the lower transferring gear engaged with the gear ring.

7. The switch device as claimed in claim 1, wherein a number of the idle gears in each of the idle gear set can be increased.

8. The switch device as claimed in claim 1, wherein a number of the idle gears composed of an upper gear and a lower gear in each of the idle gear set is increased.

* * * * *